United States Patent [19]
Cord et al.

[11] Patent Number: 5,199,155
[45] Date of Patent: Apr. 6, 1993

[54] METHOD FOR MANUFACTURE OF A COLD-GAS PYROTECHNIC GENERATOR

[75] Inventors: Paul-Philippe Cord, Paris, France; Bengt Morner, Hovas, Sweden; Kyriakos Vavalidis, Ferrieres En Bray; Christian Perotto, Ballancourt, both of France

[73] Assignee: S.N.C. Livbag, Vert Le Petit, France

[21] Appl. No.: 876,468

[22] Filed: Apr. 30, 1992

Related U.S. Application Data

[62] Division of Ser. No. 544,511, Jun. 27, 1990, Pat. No. 5,139,280.

[30] Foreign Application Priority Data

Jul. 5, 1989 [FR] France .................. 89 08989

[51] Int. Cl.⁵ .................. F42B 3/04; B21D 39/02
[52] U.S. Cl. .................. 29/463; 102/531; 280/740; 280/741
[58] Field of Search .............. 29/463; 102/531; 149/2; 222/3; 280/740, 741, 737

[56] References Cited

U.S. PATENT DOCUMENTS

| | | | |
|---|---|---|---|
| 3,827,715 | 8/1974 | Lynch | 102/531 X |
| 3,985,076 | 10/1976 | Schneiter | |
| 3,986,456 | 10/1976 | Doin et al. | 102/531 |
| 4,005,876 | 2/1977 | Jorgensen et al. | 102/531 X |
| 4,137,847 | 2/1979 | Osborne | |
| 4,414,902 | 11/1983 | Strasser | |

FOREIGN PATENT DOCUMENTS 2418905 9/1979 France .

Primary Examiner—Timothy V. Eley
Attorney, Agent, or Firm—Cushman, Darby & Cushman

[57] ABSTRACT

A method of manufacturing a cold-gas pyrotechnic generator of the type having a casing including a base and a cover with an internal chamber accessed by a central opening for the reception of pyrotechnic elements includes the steps of placing the cover on the base with filtering material inserted, rotating the casing while introducing the pyrotechnic elements through the central opening and then inserting an ignition device in the central opening.

6 Claims, 2 Drawing Sheets

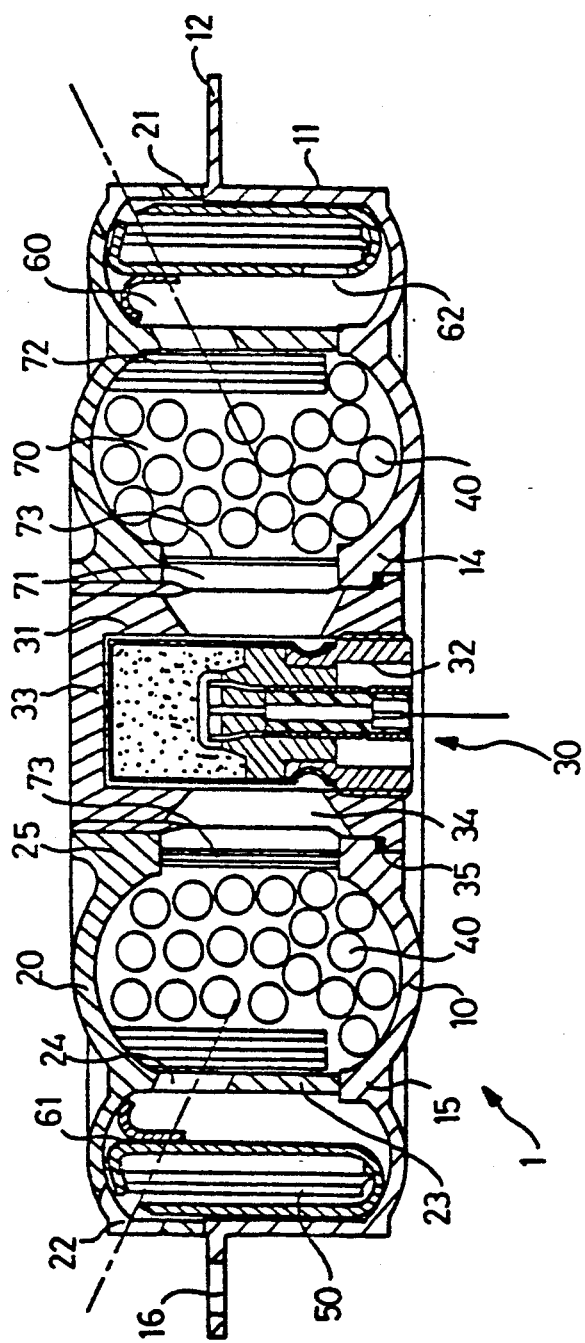
FIG_1

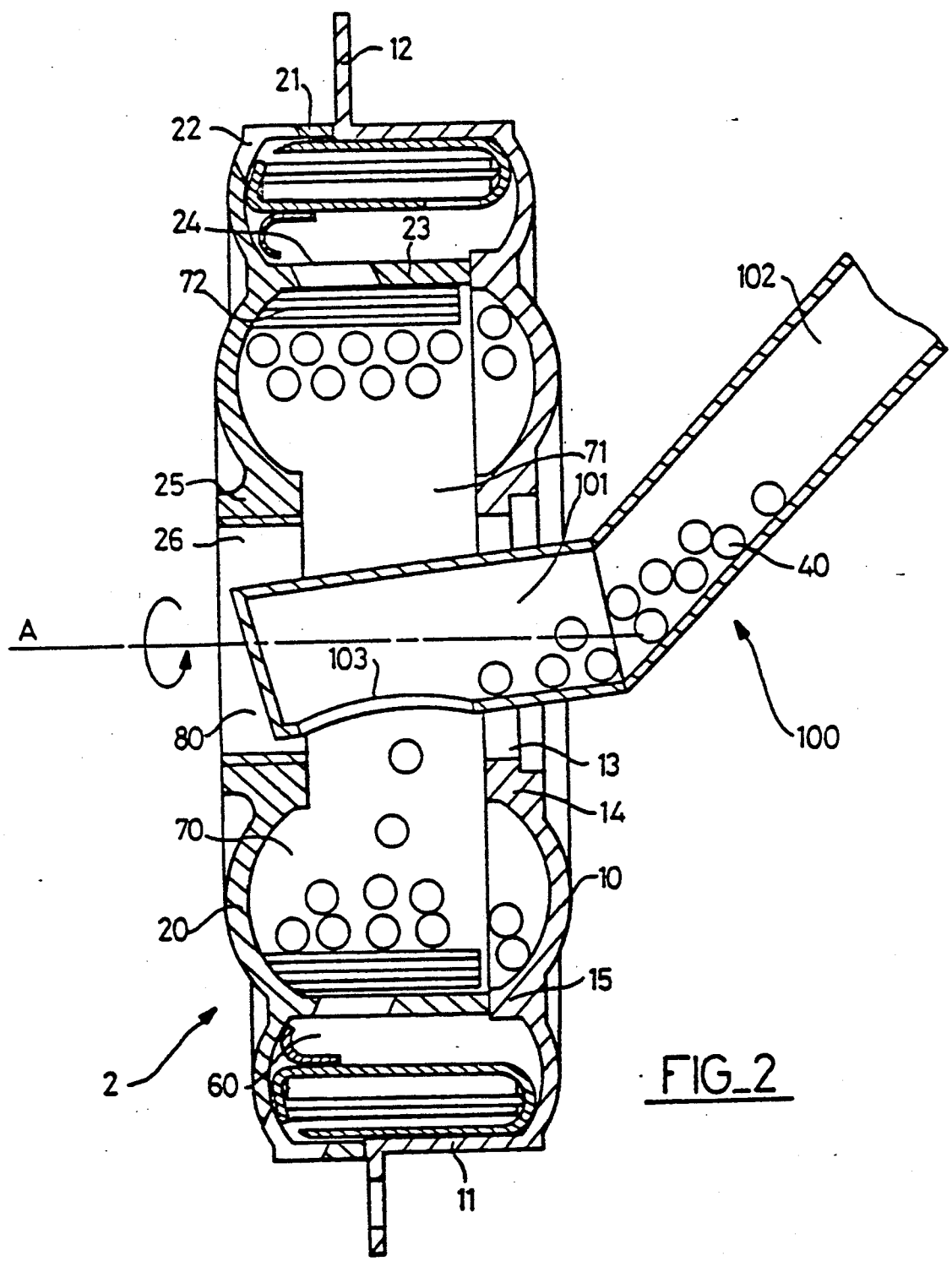
FIG_2

METHOD FOR MANUFACTURE OF A COLD-GAS PYROTECHNIC GENERATOR

This is a division of application Ser. No. 07/544,511, filed Jun. 27, 1990 now U.S. Pat. No. 5,139,280.

BACKGROUND OF THE INVENTION

1. Field of the Invention

The present invention relates to the field of automobile safety and in particular the protection, in the event of an impact, of the passengers of a motor vehicle by inflation of a protective pillow by means of the combustion gases originating from a cold-gas pyrotechnic generator. To be more precise, the invention relates to a cold-gas generator of this type with welded coaxial chambers and a method of manufacture applicable to a generator of this type enabling it to be loaded with pyrotechnic material after the mechanical components forming the various chambers have been welded.

2. Description of Related Art

It has been envisaged for many years now to protect the passengers of a motor vehicle, in the event of an impact, by inflation of a pillow which comes between the body of the passenger and the dashboard of the vehicle. Inflation of the pillow is ensured by a gas source released by an acceleration or deceleration detector calibrated above a certain threshold. In order to ensure the reliability of the protective device over time, the gas source must both preserve well over time and have a very short response time, of the order of only a few tens of milliseconds.

These two requirements have led a person skilled in the art to prefer as the gas source cold-gas pyrotechnic generators in the form of metal casings which consist essentially of a base and a cover defining inside the casing an ignition chamber which contains an ignition device connected to the acceleration or deceleration detector, a combustion chamber which contains a gas-generating pyrotechnic composition, and one or more chambers for filtering or cooling the gases. Since these gas generators must have a reduced size, and in particular a reduced height, so as to be able to be housed in particular in steering wheels of motor vehicles, a person skilled in the art generally adopts a cylindrical shape for these generators, the ignition chamber being central and the combustion and filtering chambers having an annular shape and being arranged either inside each other or on top of each other, the combustion chamber surrounding all or part of the ignition chamber. Generators of this type are, for example, described in U.S. Pat. Nos. 4,547,342, 4,578,247 or 4,590,041.

The pyrotechnic composition employed is generally a mixture of sodium nitride and mineral oxidizing agents. Since sodium nitride is an explosive compound sensitive to humidity, it is recommended that the gas generator be sealed tightly and so that it cannot be removed, on the one hand in order to protect the composition from humidity and on the other hand to prevent any inopportune feedback of the explosive component. For these reasons, the base and the cover forming the casing of the generator are usually welded together, it being possible for welding to be carried out advantageously by friction or by inertia, as indicated in the patents cited hereinabove.

However, this solution has a serious disadvantage. Most of the designs adopted up until now for gas generators do not allow them to be filled with pyrotechnic material after welding and it is thus necessary to fill them with pyrotechnic material before welding and to carry out this operation in the presence of pyrotechnic material which contains a high degree of sodium nitride, an operation which is far from being free of danger.

It is known to the Applicant that an attempt has been made to make possible this type of filling. This attempt is described in U.S. Pat. No. 4,249,673. This patent describes a gas generator of revolution formed by a base and a cover establishing two concentric chambers, an inner ignition and combustion chamber and a peripheral annular cooling and filtering chamber. The base of the generator has a central orifice to which it is possible, after the generator has been assembled, to introduce pellets of a pyrotechnic composition, and then the ignition device, into the inner chamber. Although the solution described in this patent allows the filling of the generator with pyrotechnic material after the base and the cover have been assembled, it nevertheless has two other serious disadvantages. So as to be able to ensure filling of the pellets and introduction of the ignition device, the generator must be given a height which is very much greater than that of the igniter. This makes it impossible to meet the standards imposed by constructors of motor vehicles who demand "flat" generators, whose height barely exceeds that of the igniters. Moreover, after loading, the pellets of a pyrotechnic composition are arranged around the igniter and above the later, which makes it impossible to ensure the symmetry of the ignition and the run-off of the gases into the generator where symmetry is necessary if very short response times are desired without risking an over-pressure in the generator.

At the present time a person skilled in the art does not therefore have at his disposal a gas generator having good symmetry of ignition and run-off of the gases and capable of being loaded safely with pyrotechnic material after the constituent elements of its casing have been welded.

SUMMARY OF THE INVENTION

The object of the present invention is precisely to provide such a generator for a person skilled in the art, as well as a method for manufacturing and filling this generator.

The invention therefore relates to a cold-gas pyrotechnic generator comprising a casing of revolution provided with outer orifices and consisting of a base and a cover fastened together transversely, the said base and the said cover establishing:

an internal central ignition channel in which an ignition device is placed, an annular intermediate chamber containing elements of a gas-generating pyrotechnic composition, a chamber containing filtering means and communicating with the outside of the generator through the said outer orifices, the said chambers being in communication through intermediate orifices, the said generator being characterized in that the said casing of revolution defines, between the said inner central channel and the said annular intermediate chamber, a lateral opening whose height is greater than the largest dimension of the said elements of a gas-generating pyrotechnic composition.

The said lateral opening is preferably continuous.

According to a preferred embodiment of the invention, the said base has:

an outer lateral wall, a cylindrical, intermediate initial partition section,
a central circular opening bordered by a cylindrical, inner initial partition section,
and the said cover in turn has:
an outer lateral wall which has the said outer orifices,
a cylindrical intermediate partition which has the said intermediate orifices, this partition having the same diameter as the intermediate initial partition section carried by the said base,
a cylindrical, inner initial partition section with a diameter slightly less than the diameter of the inner initial partition section carried by the said base,
the said lateral opening being arranged between the inner initial partition section carried by the said base and the inner initial partition section carried by the said cover.

The said elements of a gas-generating pyrotechnic composition are advantageously immobilized by an expansible immobilization means which may consist of a wire mesh wound around itself and placed so as to bear against the inner initial partition sections carried by the said base and by the said cover.

According to another preferred embodiment of the invention, the said cover has a central circular opening with a diameter slightly less than the diameter of the central circular opening carried by the said base, the said central circular opening carried by the cover being bordered by the said inner initial partition section carried by the base, the inner lateral surface of the said inner initial partition section being threaded.

According to a final preferred variant of the invention, the said ignition device comprises on the one hand a ring which can be screwed into the said inner central channel, the said ring having over its entire lateral surface slots which can face the said lateral opening and bring the said annular intermediate chamber into communication with the said inner central channel, and on the other hand a pyrotechnic igniter which can be fastened inside the said ring.

The invention also relates to a method for manufacturing a cold-gas pyrotechnic generator of this type, a method characterized in that:

i) in a first stage, the said casing is formed by assembling the said cover and the said base containing the said filtering means, ii) in a second stage, the casing thus formed is fastened onto a rotating device and, after the casing has been set in rotation, the elements of a pyrotechnic composition are poured into the said lateral opening of the said annular intermediate chamber inside which they are held by the centrifugal force communicated to the casing, iii) in a third stage, the immobilization means, as well as the ignition device, are introduced into the inner central channel.

According to a preferred variant embodiment of the invention, the assembly of the base and the cover is carried out by welding, and in particular by friction welding or by inertia welding.

According to another preferred variant of the invention, in the second stage the casing is fastened onto a horizontal-spindle lathe, the speed of rotation of which, during the loading of the casing, is greater than 100 revolutions per minute.

Lastly, according to a final preferred variant, during loading, the casing is subjected to vibrations.

BRIEF DESCRIPTION OF THE DRAWINGS

A detailed description of the invention is given hereinafter with reference to FIGS. 1 and 2 which illustrate the preferred embodiment of the invention.

FIG. 1 shows, seen in cross-section, a cold-gas pyrotechnic generator according to the invention, FIG. 2 shows, also seen in cross-section, the casing of the generator shown in FIG. 1 during loading.

DETAILED DESCRIPTION OF THE INVENTION

A cold-gas pyrotechnic generator 1 according to the invention characteristically comprises:

a) a casing 2 of revolution consisting of a base 10 and a cover 20 fastened together transversely,
b) an ignition device 30,
c) elements 40 of a gas-generating pyrotechnic composition,
d) filtering means 50.

As shown in the figures, the base 10 substantially has the appearance of a saucer and has an outer lateral wall 11 which may end in a flat rim 12. This flat rim 12 will later serve as a fastening rim for the generator and will advantageously be provided with perforations 16 intended to allow the passage of the members for fastening the generator to the frame of the motor vehicle.

The base 10 also has a circular central opening 13 bordered by a cylindrical, inner initial partition section 14. The base 10 moreover has a cylindrical, intermediate initial partition section 15 situated between the inner initial partition section 14 and the outer lateral wall 11.

The cover 20 has an outer lateral wall 21 with the same thickness and the same diameter as the outer lateral wall 11 carried by the base 10. This outer lateral wall 21 carried by the cover 20 comprises outer orifices 22 intended to allow the discharge of the gases generated by the generator. The cover 20 moreover carries a cylindrical intermediate partition 23 with the same thickness and the same diameter as the intermediate initial partition section 15 carried by the base 10.

The height of this intermediate partition 23 carried by the cover 20 is such that it comes into contact with the initial partition section 15 carried by the base 10 when the latter is assembled with the cover 20. The said intermediate partition 23 has intermediate orifices 24 intended to allow the gases produced by the generator to pass through. As shown in the figures, the outer orifices 22 and the intermediate orifices 24 are advantageously aligned so that they can be formed in a single operation.

According to another preferred embodiment of the invention, not shown in the figures, the intermediate orifices 24 are closed by caps which are easily broken under the influence of the rise in pressure of the generator. These caps may, for example, be made from aluminium foil.

The base 10 and the cover 20 preferably consist of a light metal such as aluminium or an aluminium alloy. These pieces may advantageously be manufactured by cold forming technique. When they are fastened together transversely, the base 10 and the cover 20 together form a casing 2 which characteristically establishes:

an inner central channel 80 communicating with the outside through the circular central opening 13 carried by the base 10, an annular peripheral chamber 60 between the lateral walls 11 and 21 on the one hand and the intermediate partition 23 and the intermediate initial partition section 15 on the other hand, an annular intermediate chamber 70 between the peripheral chamber 60 and the inner central channel 80.

Characteristically, and in a manner indispensable to the implementation of the invention, as will be explained below, the casing 2 of revolution defines, between the inner central channel 80 and the annular intermediate chamber 70 a lateral opening 71 situated between the inner initial partition section 14 carried by the base 10 and the cover 20, the height of this lateral opening 71 being greater than the largest dimension of the elements 40 described hereinafter of a pyrotechnic composition.

It will, moreover, be observed that the intermediate annular chamber 70 communicates with the peripheral chamber 60 through intermediate orifices 24 and that the peripheral chamber 60 communicates with the outside through outer orifices 22.

According to the preferred embodiment shown in FIGS. 1 and 2, the cover 20 comprises a circular central opening 26 with a diameter slightly less than the diameter of the central opening 13 carried by the base 10. The opening 26 is bordered by an inner, cylindrical, initial partition section 25 defining a threaded central channel 80. In this case, the lateral opening 71 is between the inner initial partition section 14 carried by the base 10 and the inner initial partition section 25 carried by the cover 20. As shown in FIGS. 1 and 2, the said lateral opening 71 established between the inner channel 80 and the intermediate annular chamber 70 is preferably continuous.

The annular peripheral chamber 60 is employed as a cooling and filtering chamber and it contains filtering and cooling means 50 known to a person skilled in the art, such as grids and granulates of cooling agents such as sodium bicarbonate. These filtering and cooling means 50 are held in place by a flexible metal cover 61 which bears against the inner surfaces of the base 10 and the cover 20, as shown in the figures. This metal cover 61 has gas-admission orifices 62 which are preferably situated in the bottom part of the said cover 61 bearing against the base 10.

The annular intermediate chamber 70 is employed as a combustion chamber and contains elements 40 of a gas-generating pyrotechnic composition. These elements are preferably in the form of pellets, as shown in the figures. Compositions based on sodium nitride will advantageously be employed as the gas-generating pyrotechnic composition. The preferred compositions within the scope of the present invention are compositions containing between 60% and 82% by weight of sodium nitride, between 15% and 35% by weight of molybdenum sulphide and between 2% and 9% by weight of sulphur. The compositions which are particularly preferred are those which will have undergone a heat treatment at 120° C. intended to improve their mechanical properties, as described in French Patent Application 89.05032.

As shown in the figures, prefiltering grids 72 may be provided in the combustion chamber 70, on the side of the intermediate orifices 24. The elements 40 of a pyrotechnic composition are furthermore advantageously immobilized, on the side of the lateral opening 71, by radially expansible immobilization means 73. A metal wire mesh wound around itself and placed resting against the inner initial partition sections 14 and 25 so as to bear against the elements 40 of a pyrotechnic composition will, for example, advantageously be employed as the immobilization means.

An ignition device 30 is provided inside the inner central channel 80. The ignition device 30 shown in FIG. 1 comprises on the one hand a ring 31 and on the other hand an igniter 32. The lateral wall of the ring 31 comprises an upper part with an external screw thread and which may be screwed onto the internal screw thread carried by the inner initial partition section 25. The lateral wall of the ring 31 also comprises a lower part which fits tightly, as a result of a sealing strip 35, against the inner surface of the inner initial partition section 14 carried by the base 10. The lower part of the ring 31 comprises a threaded bore in which the igniter 32, which is an electrically triggered igniter, may be screwed. In the generator shown in FIG. 1, the igniter 32 is a coaxially connected igniter, such as described in French Patent 2,557,689. The ring 31 has a solid upper part 33 and is provided over its entire lateral wall with slots 34 situated facing the lateral opening 71 and with a height which is substantially equal to the height of the latter.

The operation of the generator according to the invention is as follows. By an electric pulse, directed by the acceleration or deceleration detector, the igniter 32 is started up and in turn causes the ignition of the elements 40 of a gas-generating pyrotechnic composition. The gases produced by the combustion of these elements enter the cooling chamber 60 through the intermediate orifices 24 after having optionally broken the caps closing these orifices. The gases then enter the filtering and cooling means 50 through orifices 62 carried by the metal cover 61 and, after filtering and cooling, leave the generator through the outer orifices 22 in order to inflate the pillow attached to the generator.

The invention thus enables a cold-gas pyrotechnic generator to be provided with perfect symmetry of ignition and run-off of the gases.

Another essential advantage attained by the present invention lies in the fact that the gas generator may only be loaded with pyrotechnic products after the base 10 and the cover 20 which constitute the casing 2 have been assembled. The following procedure is used for this operation.

In a first stage, the casing 2 is formed by assembling the cover 20 with the base 10 containing the filtering and cooling means 50. To do this, the filtering and cooling means 50, the cover 61, as well as, where appropriate, the prefiltering grids 72 are arranged in the base 10 and assembly of the base 10 with the cover 20 is effected by any appropriate means. For the reasons indicated above, the preferred means of assembly will, however, be welding of the base 10 with the cover 20 on the one hand along the contact surface between the outer lateral wall 11 and the outer lateral wall 21 and on the other hand along the contact surface between the intermediate initial partition section 15 and the intermediate partition 23.

Since the base 10 and the cover 20 are bodies of revolution, the welding is very advantageously carried out by friction or by inertia. Electron beam welding is also well appropriate to this case. Whatever the technique chosen, the welding may, in any case, be carried out in the absence of any pyrotechnic element, and therefore in absolutely safe conditions.

In fact the presence of the lateral opening 71, an essential element of the invention, situated between the combustion chamber 70 and the inner central channel 80 and the height of which is greater than the largest dimension of the elements 40 of a pyrotechnic composition, enables the chamber 70 to be filled after the base 10 has been assembled with the cover 20.

In order to do this, in a second stage, the casing 2 is fastened onto a rotating device such as a lathe and, after the casing has been set in rotation, the elements 40 of a pyrotechnic composition are poured into the lateral opening 71 of the chamber 70 inside which they are held by the centrifugal force communicated to the casing 2 by it being set in rotation.

It only remains for the ignition device 30 to be introduced in a third stage into the inner central channel 80, after having optionally introduced the immobilization means 73, in order to obtain the complete generator according to the invention.

According to the preferred method of loading, shown in FIG. 2, the casing 2 is placed on a lathe equipped with jaws, the axis A of the lathe being in the horizontal position. The casing is then rotated and a feed device 100, consisting of a cylindrical feed spout 101 with a diameter less than the diameter of the channel 80, is introduced into the inner channel 80. This spout 101 is extended by a feed pipe 102 which is inclined and connected to a feed hopper, not shown.

The spout 101 is closed with a sloping edge and is provided in its lower part with an opening 103 with a diameter greater than the diameter of the elements 40 of a pyrotechnic composition. This opening 103 is situated almost at the end of the spout 101 which is positioned such that the opening 103 faces the lateral opening 71 of the combustion chamber 70. The feed hopper then delivers a sufficient quantity of elements 40 of a pyrotechnic composition in order to fill the combustion chamber 70. The elements 40 drop through the pipe 102 as far as the spout 101 from where they fall as a result of gravity into the chamber 70 through openings 103 and 71. The elements 40 introduced into the chamber 70 are held pressed flat in the latter towards the intermediate partition 23 under the influence of the centrifugal force communicated to the casing 2.

The Applicant has noted that the speed of rotation of the casing 2 must be equal to at least 100 revolutions per minute and that a speed of 300 revolutions per minute is generally sufficient for elements of a pyrotechnic composition in pellet form and for the generators which are usually employed in the automobile industry. Moreover, the Applicant has also observed that a better filling coefficient of the combustion chamber 70 with elements 40 is obtained if, during loading, the casing 2 is not only set in rotation but that it is also subjected to vibrations. Such vibrations, preferably longitudinal, may, for example, be obtained by placing an electromagnetic vibrating plate between the jaws of the lathe and the casing 2.

When the loading with elements 40 is completed, the feed device 100 is withdrawn, the casing 2 being maintained in rotation. The metal wire mesh 73, wound around itself, is then introduced into the inner channel 80 from where it is inserted into the lateral opening 71, while allowing it to expand radially.

The lathe is then stopped and it then only remains, in a last stage, to screw in the ring 31, and then the igniter 32, in order to obtain the complete generator.

We claim:

1. A method of manufacturing a cold-gas pyrotechnic generator of the type having a casing of revolution having a central axis, said casing being provided with outer orifices and including a base and a cover fastened together transversely, said base and said cover together forming:
    an inner ignition channel for receiving an ignition device;
    an annular intermediate chamber employed as a combustion chamber or containing elements of a gas-generating pyrotechnic composition;
    an annular peripheral chamber employed as a cooling and filtering chamber, said peripheral chamber containing filtering means;
wherein said intermediate chamber and said peripheral chamber are in communication through intermediate orifices therebetween, and said peripheral chamber is in communication with the outside through said outer orifices, and wherein said casing defines, between said inner central ignition channel and said intermediate chamber, a lateral opening whose height is greater than the largest dimension of said elements of gas-generating pyrotechnic composition, wherein said lateral opening is continuous about said central axis, the method comprising the steps of
    a) placing the filtering means in the chamber and assembling the cover with the base,
    b) rotating the casing about the central axis thereof,
    c) pouring the pyrotechnic composition into the lateral opening of the chamber while rotating the casing, and
    d) introducing an ignition device into the inner central channel.

2. The method according to claim 1, wherein, in step a), assembling of the cover with the base is carried out by welding.

3. Method according to claim 2, characterized in that the welding is obtained by friction.

4. The method as claimed in claim 1, wherein step b) is carried out by fastening the casing on a horizontal-spindle lathe.

5. Method according to claim 4, characterized in that the speed of rotation of the casing (2) during loading is greater than 100 revolutions per minute.

6. Method according to claim 5, characterized in that, during loading, the casing (2) is subjected to vibrations.

* * * * *